United States Patent [19]
Inoue

[11] 3,779,483
[45] Dec. 18, 1973

[54] APPARATUS FOR GIVING NOTICE TO THE APPROACH OF END OF TAPE

[75] Inventor: Syuzi Inoue, Gunma, Japan

[73] Assignees: Tokyo Sanyo Electric Co., Ltd., Gunma; Sanyo Electric Co., Ltd., Osaka, Japan

[22] Filed: Dec. 2, 1971

[21] Appl. No.: 203,983

[30] Foreign Application Priority Data

Dec. 2, 1970 Japan .................... 45/108332
Dec. 2, 1970 Japan .................... 45/108333

[52] U.S. Cl. .................... 242/191, 242/206
[51] Int. Cl. ... B65h 59/38, G03b 1/02, G11b 15/32
[58] Field of Search ....................
242/186–191, 206–208; 274/4 D, 11 D; 318/6, 7

[56] References Cited

UNITED STATES PATENTS

| | | | |
|---|---|---|---|
| 2,912,178 | 11/1959 | Schuyler | 242/206 |
| 3,297,266 | 1/1967 | Rumple | 242/186 |
| 3,458,155 | 7/1969 | Planteijdt | 242/186 |

*Primary Examiner*—Leonard D. Christian
*Attorney*—James E. Armstrong et al.

[57] ABSTRACT

An apparatus for giving a warning during the transport of a tape of the approach of the end of the tape when some length of tape still remains for recording or playback before the end of the tape is reached. The warning is produced by detecting when the rotational speed of the rotary shaft of the supply reel or take-up reel has reached a given level as the transport proceeds from one reel to the other.

19 Claims, 6 Drawing Figures

APPARATUS FOR GIVING NOTICE TO THE APPROACH OF END OF TAPE

BACKGROUND OF THE INVENTION

1. Field of the Invention

The present invention relates to an apparatus for notifying the operator that the termination of transport of tape is approaching, and more particularly to an apparatus to be incorporated for example in a magnetic tape recorder for giving notice of the approach of the tape end thus warning when only a small amount of the recording tape remains on the supply reel. The invention finds useful applications to various tape-like articles such as magnetic tape, video tape, roll film, ribbon and the like.

2. Description of the Prior Art

With magnetic tape recorders, various technical teachings have heretofore been known for detecting the end of tape. Generally during a recording operation, however, it is more convenient to know the approach of the tape end at the time when some length of tape still remains for recording or playback before its end is reached rather than to detect the end of the tape. It is noted that by the time the end of tape is detected, the tape leader portion incapable of recording has already finished travelling, and the operator will then perform the desired procedure such as the change of tape. This procedure frequently permits an idle time to elapse without recording, whereas if it is possible to notify the operator that a small amount of tape remains on the supply reel while the tape is being transported, the operator will then be able to make preparation for the desired procedure, with the result that he can set the recorder for the subsequent recording operation within a remarkably reduced period of time after the tape end is reached. Such function is most desired not only for standard tape recorders but also for the so-called dictating transcriber machine which comprises a tape recorder in combination with a typewriter and which are frequently used for recording an important conference. For this purpose it may be suggested to provide switching means by attaching a pulse generating element such as an electroconductive foil to a predetermined position before the tape end. However, since the tape is incapable of recording at the position of the pulse generating element, there arises the trouble that recording will be interrupted. In this case, moreover, there is the further disadvantage that the warning of the tape end is available only with special tapes equipped with such a pulse generating element.

SUMMARY OF THE INVENTION

With a reel-to-reel tape recorder including a pair of reels with tape extending therebetween, the rotational speed of at least one of the rotary shafts associated with the reels varies all the time due to the change in the diameter of the wound-up tape on the respective reels during the transport of the tape. For instance, in the case of the capstan drive system wherein the tape is driven at a constant speed, the rotational speed of the take-up reel gradually decreases as the transport of the tape proceeds progressively increases the rotational speed of the supply reel. Further with the reel drive system wherein the tape is driven only by the driving force given to the reel, the rotational speed of the supply reel increases steadily as the transport of the tape proceeds.

Accordingly, an object of this invention is to provide an apparatus for giving notice to the approach of the end of the tape which utilizes the change in the rotational speed of a rotary shaft associated with a reel resulting from the change in diameter of the wound-up tape on the reel so as to operate notifying means therein when the rotational speed of the rotary shaft reaches a given level with some length of tape still left for recording or playback before its end is reached while it is being transported.

Another object of this invention is to provide an apparatus for giving notice of the approach of the tape end wherein the notifying means is free of malfunctions usually experienced due to nonuniform rotation of the rotary shaft.

Another object of this invention is to provide an apparatus for giving notice of the approach of the tape end incorporating therein notifying means whose operation is very advantageous to the operator.

Other objects, characteristics and advantages of the present invention will become apparent from the following detailed description of embodiments thereof shown in the accompanying drawings.

DESCRIPTION OF THE PREFERRED EMBODIMENTS

Figure 1:
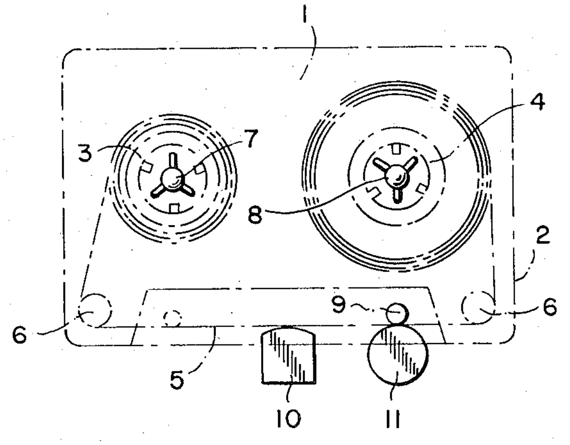
FIG. 1 is a plan view showing a tape drive mechanism employing a tape magazine including a pair of reels.
Figure 2:
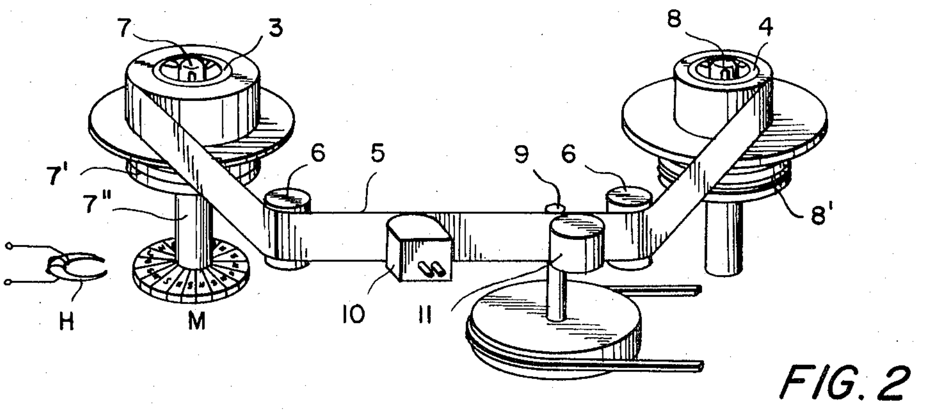
FIG. 2 is a perspective view corresponding to FIG. 1 and showing the reels and drive system of the tape drive mechanism.

Referring to FIG. 1, a tape magazine 1, so-called compact cassette, is manufactured in accordance with the international standards and comprises a flat rectangular container 2, a pair of rotatable reels 3 and 4 housed in the container 2, a tape 5 secured at its opposite ends to the reels and extending therebetween and guide rollers 6 and 6 for guiding the tape along and in parallel to the inner face of front wall of the container having a plurality of windows. When the tape magazine 1 is loaded in the tape operating station of the tape recorder, the reels 3 and 4 engage a supply reel shaft 7 and take-up reel shaft 8 respectively and a capstan 9 projects to rear of the tape 5. When the recorder is set for recording, a magnetic head 10 and a pinch roller 11 enter the container 2 through the windows in its front wall. Thus, the magnetic head 10 is brought into pressing contact with the tape 5 and at the same time, the tape is driven at a constant speed through the cooperation of the capstan 9 rotating at a constant speed and the pinch roller pressing thereagainst. The tape driven forward along the capstan 9 is wound up on the reel 4 rotated by the take-up reel shaft 8. FIG. 2 shows the reels 3 and 4 of the tape magazine 1 as they are driven together on a rotary support 7′ of the supply reel shaft 7 and a rotary support 8' of the take-up reel shaft 8. The same parts as those shown in FIG. 1 are referred to by the same reference numerals.

As the tape 5 is transported from the reel 3 to the reel 4, the diameter $r_1$ of the tape wound up on the reel 3 gradually decreases with a progressive increase in the diameter $r_2$ of the tape wound onto the reel 4. Since the speed of the travelling tape 5 is constant during transport, the change in the diameter of the wound-up tape causes the rotary support 7' associated with the reel 3 to rotate at a gradually increasing speed while steadily decreasing the rotational speed of the rotary support 8' associated with the reel 4. Accordingly, the approach of the end of the tape 5 can be detected by detecting the increase in the rotational speed of the rotary support 7' for the supply reel or the decrease in the rotational speed of the rotary support 8' for the take-up reel or by detecting the difference between the two speeds. However, it is preferable to detect the increase in the rotational speed of the rotary support 7' for the supply reel 3 since when the end of the tape is approaching, the rotational speed is always constant irrespective of the length of the tape 5 insofar as the thickness of the tape and the outer diameter $r_o$ of the reel are determined. With respect to all the compact cassette commercially available at present, the speed of travel of the tape 5 and the outer diameter of the reels 3 and 4 are set identical by the international standards. In order to detect the increase in the rotational speed of the rotary support 7', therefore, there is provided a signal generator for producing an electrical signal having a period corresponding to the rotational speed of the rotary shaft 7'' which rotates integrally with the rotary support 7'.

Figure 3:
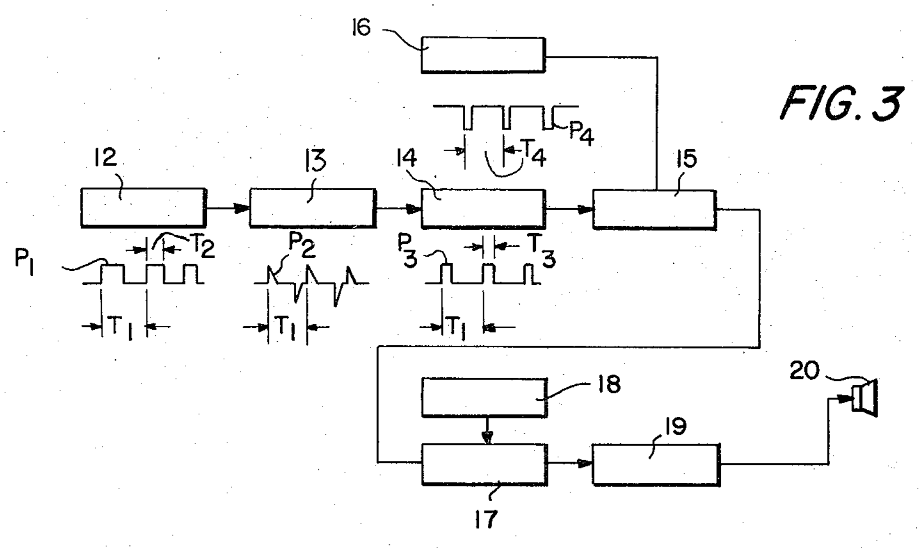
FIG. 3 is a block diagram showing electrical connection.

With reference to FIG. 3, the signal generator is represented by a block 12. The signal generator 12 may be of such construction that it simply turns on and off in operative relation to the rotation of the rotary shaft 7''. For instance, the generator shown in FIG. 2 comprises a magnetic disc M mounted on the rotary shaft 7'' and N and S poles alternately arranged in the direction of rotation and a detecting head H opposing the magnetic disc M. The signal generator produces, for example, 10 rectangular waves $P_1$ during one turn of rotation of the rotary shaft 7''. With the increase in the rotational speed of the rotary shaft 7'', the period $T_1$ and wave width $T_2$ of the rectangular wave $P_1$ decrease gradually. Since the change in the wave width is not desirable in improving the accuracy of detection, the rectangular waves $P_1$ are differentiated by a differentiation circuit 13 for shaping to thereby obtain waves of a uniform width. The differentiated pulses $P_2$ only on one side, namely positive pulses or negative pulses alone, are then applied to a monostable multivibrator circuit 14. The rectangular pulses $P_3$ obtains as the output of the circuit 14 have been regulated to a uniform pulse width $T_3$ in accordance with the time constant of the circuit. Thus the uneven rectangular waves $P_1$ are shaped to rectangular pulses $P_3$ having a uniform pulse width. Since the rectangular pulses $P_3$ are produced in corresponding relation to the differentiated pulses $P_2$ only on the positive or negative side, the period of the rectangular pulses $P_3$ coincides with that of the rectangular waves $P_1$. The rectangular pulses $P_3$ are applied to a counter circuit 15, comprising an integration circuit, which is reset with reset pulses $P_4$ at an interval corresponding to a definite period $T_4$. Reset pulses are generated by a reset circuit 16 comprising an astable multivibrator circuit. The output of the counter circuit 15 is applied to a comparison circuit 17, where it is compared with the reference voltage supplied from a reference voltage circuit 18. The output of the comparison circuit 17, when produced, operates an oscillation circuit 19 which emits an oscillation sound through a speaker 20 for warning.

Figures 4, 5, 6:
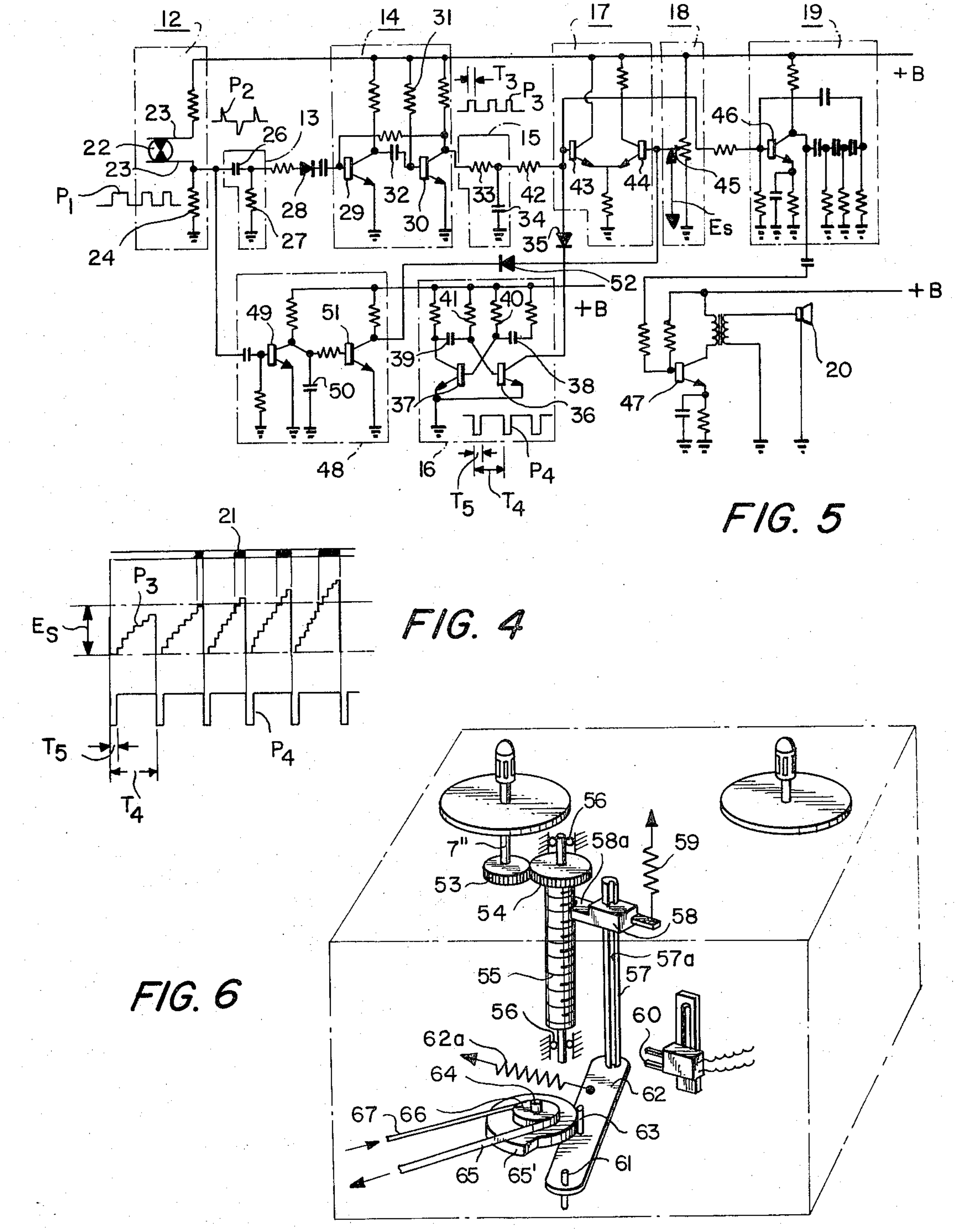
FIG. 4 is a diagram illustrating the waveforms given by a measuring counter circuit and reset circuit and the mode of operation of notifying means.
FIG. 5 is an electric circuit diagram showing a preferred embodiment of this invention.
FIG. 6 is a perspective view showing another embodiment comprising a mechanical construction in accordance with this invention.

Referring to FIG. 4, the rectangular pulses $P_3$ are successively added by the counter circuit 15 which is reset by the reset pulses $P_4$ at the definite period $T_4$. If the number of the rectangular pulses $P_3$ is small within the period $T_4$, the resulting sum will not reach the reference voltage value Es, but as the period $T_1$ of the rectangular pulses $P_3$ is gradually shortened with the increase in the rotational speed of the rotary shaft 7'' for the supply reel, the sum of the rectangular pulses $P_3$ within the period $T_4$ will reach the reference voltage value Es. The sum reaches the reference voltage value Es progressively earlier in each of successive periods $T_4$. The solid bar portion 21 indicates the period during which the sum of the pulses reaches or exceeds the reference voltage value Es. It will be apparent that in corresponding relation to the solid bar portions, the warning sound is produced intermittently from the speaker 20 and the duration of the sound, although very short at the beginning, increases progressively thereafter.

FIG. 5 illustrates a preferred embodiment of this invention. A signal generator 12 comprises a rotor 22 including electroconductive portions and insulating portions arranged alternately on its outer peripheral surface, a pair of contacts 23 in contact with the rotor and a load resistance 24. The rotor 22 is driven in operative relation to the rotary shaft 7'' for the supply reel, whereby the contacts 23 are electrically connected together or disconnected. When the circuit is closed between the contacts 23, a positive rectangular wave $P_1$ is obtained at a terminal 25 of the load resistance 24. The present embodiment is so designed as to give ten rectangular waves $P_1$ at the terminal 25 during a turn of rotation of the rotary shaft 7''. The rectangular waves $P_1$ are differentiated by a differentiation circuit 13 comprising a capacitor 26 and a resistance 27. The differentiated pulses $P_2$ obtained at the output of the differentiation circuit 13 are applied to a diode 28, where the negative pulses are cut off, permitting the positive pulses alone to be applied to a monostable multivibrator circuit 14. Upon application of the differentiated positive pulses $P_2$ to the monostable multivibrator circuit 14, a transistor 29 is switched to the ON state and a transistor 30 to the OFF state. The period of time $T_3$ that transistor 30 remains in the OFF state is determined by a resistance 31 and a capacitor 32. The period is selected at a sufficiently small value as compared with the minimum period of ON-OFF action between the contacts 23 during recording. The collector of the transistor 30 gives positive rectangular pulses $P_3$ having a pulse width equal to the above-mentioned time $T_3$. The rectangular pulses $P_3$ are successively added by a counter circuit 15 composed of a resistance 33 and a capacitor 34. Through a diode 35 the capacitor 34 is connected in parallel with a transistor 36 of an astable multivibrator circuit 16. The astable multivibrator circuit 16 comprises transistors 36 and 37 with their collectors and bases connected together by capacitors 38 and 39 respectively. The period of time $T_5$ for the transistor 36 to remain in the ON state with the transistor 37 in the OFF state is determined by a resistance 40 and a capacitor 38, while the period of time $T_4$ for the transistor 36 to remain in the OFF state with the transistor 37 in the ON state is determined by a resistance 41 and a capacitor 39. The time $T_5$ is selected at a sufficiently small value compared with the time $T_4$. Thus, the collector of the transistor 36 gives negative reset pulses $P_4$ having a period of $T_4$ and a pulse width $T_5$ which is extremely small as compared with the period. When the reset pulses $P_4$ are produced, namely when the transistor 36 is switched to the ON state, the charge in the capacitor 34 is completely discharged through a resistance 42, diode 35 and transistor 36. A comparison circuit 17 comprises a pair of transistors 43 and 44 connected together for differential amplification. The output of the measuring counter circuit 15 is introduced to the base of the transistor 43, while a reference voltage Es is supplied from a reference voltage circuit 18 comprising a potentiometer 45 to the base of the transistor 44. When the output voltage of the measuring counter circuit 15 exceeds the reference voltage Es, the transistor 43 is switched to the ON state and the transistor 44 to the OFF state. The reference voltage Es can be controlled as desired by the external operating the potentiometer 45. In the present embodiment, the reference voltage Es is so controlled that it is equal to the output voltage of the measuring circuit 15 corresponding to the rotational speed of the rotary shaft 7'' 2 minutes before the end of tape is reached. The aforementioned comparison circuit 17 may comprise a Schmitt circuit, in which case the reference voltage Es serves as an operating voltage. Upon the switching of the transistor 44 to the OFF state, a forward bias voltage is applied to the base of a transistor 46 of a phase oscillation circuit 19, whereby the phase oscillation circuit 19 is operated to produce a signal at the frequency of 1,400 Hz, which is amplified by a transistor 47 and then emitted from a speaker 20.

The warning sound is emitted from the speaker 20 intermittently in corresponding relation to the resetting of the measuring counter circuit 15 which takes place at a definite interval. Since the output voltage of the measuring counter circuit 15 reaches the reference voltage Es gradually earlier within the respective intervals of resetting as the tape end approaches, the duration of the intermittent sound increases progressively. This is very effective in notifying the operator of the approach of the tape end while the tape is being transported for recording or playback.

Because the counter circuit 15 is reset at a definite interval, the output of the circuit exhibits an average rotational speed of the rotary shaft 7'' within the resetting interval but does not reflect usual uneven rotation of the rotary shaft 7'' accordingly.

The present embodiment further includes means 48 for detecting the end of the tape. While being supplied with the rectangular waves $P_1$ from the signal generator 12, a transistor 49 turns ON and OFF repeatedly in response to the rectangular waves, with the result that the voltage to which the capacitor 50 charges will not exceed a certain level. When the end of tape 5 is reached, the reels 3 and 4 come to a halt since the respective ends of the tape are secured to the reels. The halting of the reel 3 stops the supply reel shaft 7 to terminate generation of the rectangular waves $P_1$, whereupon the transistor 49 is switched to and held in the OFF state, consequently increasing up the voltage in the capacitor 50, which in turn switches a transistor 51 to an ON state. Due to the switching of the transistor 51, the base of transistor 44 in the comparison circuit 17 is grounded through a diode 52 and the transistor 51, so that the transistor 44 is switched to the OFF state. This initiates the operation of oscillation circuit 19 which emits an oscillation sound through the speaker 20. The sound thus produced, being continuous, is distinct from the foregoing intermittent warning sound which indicates the approach of the tape end. Thus, upon hearing the intermittent warning sound while the tape is still being transported for recording or playback, the operator can prepare for the procedure to be required when the tape end is reached and upon termination of the transport and change of the intermittent warning sound to the continuous sound, he can perform the desired procedure thus prepared.

FIG. 6 shows another embodiment wherein the present invention is embodied with a mechanical construction. The structure and operation of this embodiment will now be described. A gear 53 is mounted on the lower end of the rotary shaft 7'' of the supply reel. Disposed in parallel to the rotary shaft 7'' is a helical drive shaft 55 formed with a helical groove in its peripheral surface and carrying at its one end a gear 54 meshing with the gear 53 on the rotary shaft 7''. The drive shaft 55 rotatably supported on bearings 56 at its opposite ends is driven at a varying speed in response to the change in the rotational speed of the rotary shaft 7''. In engagement with the helical groove in the helical drive shaft 55 is a projection 58*a* of an actuating member 58 slidably mounted on a guide rod 57 disposed in parallel to the helical shaft 55. Although the actuating member 58 is free to slide on the guide rod 57, it is prevented from rotation relative thereto by virtue of the engagement with a guide groove 57*a* formed in the guide rod 57 in its longitudinal direction. A spring 59 urges the actuating member upwards all the time. In proximity to the lower end of the helical drive shaft 55 and within the path of travel of the actuating member 58, there is disposed a movable contact member of a switch 60 connected to the notifying circuit. The position of the switch 60 is adjustable longitudinally of the guide rod 57 so that the position where the movable contact member is closed can be determined as desired.

The guide rod 57 is fixed to a pivotal arm 62 supported on a pivot 61. A pin 63 extending from the pivotal arm 62 is in contact with a cam plate 65 mounted on a rotatable shaft 64. A spring 62*a* urging the pivotal arm 62 toward the helical shaft 55 keeps the projection 58*a* of the operation member 58 and pin 63 in pressing contact with the helical shaft 55 and cam 65 respectively. The rotatable shaft 64 has a pulley 66 which is associated by a belt 67 with drive means adapted to rotate at a constant speed. The drive means may be an independent timing motor. In accordance with the present embodiment, however, the rotation of the capstan drive mechanism which is driven at a constant speed during the transport of tape is transmitted to the pulley 66 through a reduction gear and the belt 67 so as to rotate the cam plate 65, for instance, at a rate of one turn every 3 seconds.

In accordance with this embodiment, the switch 60 is set at such position that when the actuating member 58 is moved downward from the upper end of the helical drive shaft 55 for 3 seconds in response to the relational speed of the rotatable shaft 7'' 2 minutes before the tape end is reached, the actuating member reaches the switch 60 and closes the movable contact member.

Thus the rotation of the rotary shaft 7'' is transmitted through the gears 53 and 54 to the helical drive shaft 55, the rotation of which causes the actuating member 58 to move down against the action of the spring 59. On the other hand, the cam plate 65 makes a turn of rotation every 3 seconds. The cam protrusion 65' of the cam plate, upon coming into contact with the pin 63, rotates the pivotal arm 62 about the pivot 61 in a clockwise direction against the restoring spring 62a to disengage the projection 58 of the actuating member 58 from the helical shaft 55 and thereby permit the actuating member 58 to return upward to the original position under the pulling action of the spring 59.

With the increase in the rotational speed of the rotary shaft 7'' as the transport of tape proceeds, the amount of downward movement of the actuating member 58 steadily increases within a definite period of rotation of the cam plate 65, namely within the period of 3 seconds.

Accordingly, when the rotational speed of 2 minutes before the tape end is reached, the actuating member 58 is moved to the position to close the movable contact member of the switch 60 and the consequent closing of the switch 60 energizes the notifying circuit.

As the rotational speed of the rotary shaft 7'' increases with further approach of the tape end, the actuating member 58 reaches the movable contact member of the switch 60 in a gradually shortened period of time, with the result that the operation interval of the notifying circuit within the definite period, namely within 3 seconds is steadily reduced with its operation period prolonged gradually, thus effectively notifying the operator of the approach of the tape end while the tape is being transported for recording or playback before its end is reached.

The foregoing embodiments are given only for the purpose of illustration and it is to be understood that those skilled in the art can make various alterations and modifications without departing from the principle of this invention.

What is claimed is:

1. An apparatus for issuing an alarm that the end of the recording and playing medium part of a tape shape body is approaching while keeping the tape shape body transporting means in operation, comprising,

*a.* means for transporting the tape shape body,

*b.* two rotating shafts interlocked to a pair of the supply and take-up reels over which the tape shape body is spanned,

*c.* a means for converting the rotational speed of at least one of said pair of the rotating shafts into a corresponding measurable quantity,

*d.* means for preliminarily fixing the set value corresponding to the rotational speed at which said rotating shaft is running when the end of the tape shape body is approaching, the rotational speed of the rotating shaft being altered with the changing roll diameter of the tape shape body on the reel as the tape shape body is transported,

*e.* comparing means for detecting that the value given by the converting means has exceeded the aforementioned set value, and

*f.* means for notifying that the end of the tape shape body is approaching, responsive to the output from the comparing means.

2. An apparatus as described under claim 1, wherein said converting means is so composed that the rotational speed of the rotating shaft interlocked to the shaft of the supply reel is converted into a measurable quantity.

3. An apparatus as described under claim 2, wherein the converting means includes a means for generating the measurable quantity with a period correlated with the rotational speed of the rotating shaft and the means for measuring said measurable quantity.

4. An apparatus as described under claim 1, wherein the setting means is so composed as to permit the value to be set from outside at a value corresponding to the position on the tape to have the alarm issued a certain desired time before the end of the side of the tape which is to make recording or playing is reached.

5. An apparatus for issuing an alarm that the end of the recording and playing medium part of the tape shape body is approaching without interrupting the operation of the tape shape body transporting means, comprising,

*a.* means for transporting the tape shape body,

*b.* two rotating shafts interlocked to a pair of the supply and take-up reels over which the tape shape body is spanned,

*c.* a converting means composed of an element for generating a pulse with a period correlated with the rotational speed of the rotating shaft of the supply reel, the wave form shaping element for shaping the output to a pulse of a definite form, and the integrating element for accumulating the subsequent output pulses,

*d.* a means for preliminarily fixing the set voltage corresponding to the rotational speed at which said rotating shaft is running when the end of the tape shape body is approaching, said rotational speed of the rotating shaft being altered with the changing roll diameter of the tape shape body put on the supply reel as the tape shape body is transferred,

*e.* comparing means for detecting that the value given by the converting means has exceeded the set value, and

*f.* a means for issuing an alarm, responsive to the output from the comparing means.

6. An apparatus for issuing an alarm that the end of the tape shape body is approaching while keeping the tape shape body transporting means in operation, comprising,

*a.* means for transporting the tape shape body,

*b.* two rotating shafts interlocked to the shafts of a pair of the supply and take-up reel, over which the tape shape body is spanned,

*c.* a means for converting the rotational speed of at least either one of said paired rotating shafts into a corresponding measurable quantity,

*d.* means for measuring the output from the converting means at certain periodical intervals,

*e.* means for setting the set value of the measurable quantity measured at the certain periodical intervals to the rotational speed at which said rotating shaft is running when the end of the tape shape body is approaching, said rotational speed being altered with the changing roll diameter of the tape shape body on the supply reel as the tape shape body is transported.

*f.* comparing means for detecting that the value given by the converting means has exceeded the set value, and

*g.* means for issuing an alarm that the tape shape body is drawing near to its end, responsive to the output from the comparing means.

7. An apparatus as described under claim 6, wherein the converting means is composed of a combination of an element for generating a synchronous pulse correlated with the rotational speed of the rotating shaft and the wave form shaping means for shaping the output to a pulse of a definite form.

8. An apparatus as described under claim 6, wherein the measuring means is composed of an element for intergrating the output from the converting means.

9. An apparatus as described under claim 7, wherein the means for taking the measurements at certain periodical intervals is composed of a combination of an element for integrating the output from the converting means and another element for periodically resetting the said element.

10. An apparatus as described under claim 6, wherein the means for issuing an alarm is composed of a trigger system sound converter, said sound converter being adapted to operate only during the time when the output continues coming from the comparing means.

11. An apparatus as described under claim 10, wherein the sound converter is composed of a combination of an oscillator circuit energized by the output from the comparing circuit and the speaker operating on the output.

12. An apparatus as described under claim 6, wherein the converting means is composed of a speed reducing mechanism for reducing the speed of rotation of the rotating shaft and a mechanism for converting the rotary frequency of the rotating shaft into a mechanical displacement.

13. An apparatus as described under claim 12, wherein the means for taking measurement at the certain periodical intervals is composed of a combination of the speed reducing mechanism and a reset mechanism which periodically disengages the mechanism for making the convertion into the mechanical displacement, from the speed reducing mechanism, and then, restores their engagement at the position where the mechanical displacement was started.

14. An apparatus as described under claim 13, wherein the reset mechanism is composed of a cam mechanism adapted to engage with the capstan driving mechanism composing the means for transporting the tape shape body.

15. An apparatus as described under claim 12, wherein the reset mechanism is composed of a cam mechanism adapted to engage with the capstan driving mechanism composing the means for transporting the tape shape body, and, then, periodically disengage the mechanism for making the mechanical displacement to from the speed reducing mechanism, and springs adapted to return the means for making the mechanical displacement to the position where the displacement was started.

16. An apparatus for issuing an alarm that the end of the magnetic tape is approaching by altering the interval of producing the sound as the tape is drawing near to its end, comprising

*a.* means for transporting the magnetic tape at a constant speed,

*b.* first a rotating shaft interlocked to a supply shaft for feeding the magnetic tape to said means for the constant speed transport,

*c.* a second rotating shaft interlocked to a take-up shaft for taking up the magnetic tape reeled out of the means for the constant speed transport,

*d.* means for converting into a mechanical displacement the rotational speeds of the first rotating shaft of the supply reel which may rise as the magnetic tape is drawing near its end by integrating the rotational speeds at certain time intervals, said means composed of a speed reducing mechanism mounted on the first rotating shaft of the supply reel, a screw shaft adapted to engage with the said mechanism to be driven thereby, an actuating member which, is provided with a projecting piece adapted to engage with the thread of the said screw, axially moves with the turning of the screw shaft, a cam mechanism driven by the means for the constant speed transport to disengage the actuating member from the screw shaft at certain time intervals, and springs adapted to return said actuating member to its original position when the operating member is disengaged from the screw shaft,

*e.* a switch having its movable terminal arranged in the range of displacement of the actuating member so that it may be energized by the actuating member,

*f.* a means for setting, in the range of displacement of the operating member, the operating position of the said switch at a position agreeing with the displaced position of the actuating member corresponding to the speed, at which said rotating shaft is running as the end of the magnetic tape is approaching, said speed being altered with the changing roll diameter of the magnetic tape put on the reel as the magnetic tape is transported, and g. a means for issuing an alarm, energized by the switch.

17. An apparatus for issuing an alarm that the end of the tape shape body is approaching, comprising,

*a.* a means for transporting the tape shape body at constant speed,

*b.* a first rotating shaft interlocked to the feed shaft for feeding the tape shape body to the said means for constant speed transport,

*c.* a second rotating shaft interlocked to the take-up shaft for taking up the tape shape body reeled out of the means for the constant speed transport,

*d.* means for measuring the rotational speeds of first the rotating shaft of the feed reel which may rise as the tape shape body is drawing near its end, said means being composed of a rotary disc mounted on the second rotating shaft of the supply reel and provided with segments to be magnetized, held at equal intervals on its circumference, the rotation detecting coil arranged facing the circumference, a single stabilized multivibrator circuit which shapes the output to a rectangular pulse with a definite pulse width, a CR integrating circuit for integrating the subsequent output, and a nonstabilized multivibrator circuit which discharges a capacitor composing said circuit at a very short periodical time interval as compared with the normal operating time period of the means for the constant speed transport of the tape, e. means composed of voltage dividing variable resistance for setting the value determined by the measurable quantity measured at the certain time intervals corresponding to the rotational speed, at which the said rotating shaft is running when the end of the tape shape body is approaching, speed being altered with the changing roll diameter of the tape shape body on the reel as the tape shaped body is transported.

f. a comparing means for detecting that the measured value has exceeded the set value, composed of a differential amplifier circuit designed to use the set value as one of its input and the output of the integrating circuit as the other input, g. means for issuing an alarm that the end of the tape shape body is approaching by altering the interval of producing the sound as the tape shape body is drawing near its end said means being composed of a combination of an oscillator circuit oscillating with an audible frequency, by using the output of said comparing means as its trigger input, and h. end detecting means composed of a switching transistor which is made as the output of the detecting coil is interrupted in concert with a stopping of the rotating shaft of the supply reel, and a circuit connection which triggers the oscillator circuit by the operation of the said transistor, so that the oscillator circuit may be continuously oscillated when the end of the tape shape body is reached.

18. An apparatus as described under claim 17, wherein the comparing means is composed of a Schmitt circuit.

19. An apparatus as described under claim 17, wherein the measuring means is composed of a rotary body mounted on the rotating shaft of the supply reel and provided with parts having conductive and nonconductive members arranged side by side, a pair of springs designed to be short-circuited by the conductive members of the said rotary body, a circuit connection which provids a power source energization between the said pair of springs and the load resistance, a singly stabilized multivibrator circuit for shaping the terminal voltage of the load resistance to a rectangular pulse with a definite pulse width, another singly stabilized multivibrator circuit for integrating the output therefrom, and a nonstabilized multivibrator circuit which discharges the capacitor composing said circuit at a very short periodical time internal as compared with the normal operating time period of the means for the constant speed transport of the tape.

* * * * *